United States Patent
Yanagida et al.

(10) Patent No.: US 8,342,618 B2
(45) Date of Patent: Jan. 1, 2013

(54) TRACTION CONTROL DEVICE FOR VEHICLE

(75) Inventors: Hisanori Yanagida, Wako (JP); Yoshinari Sugita, Wako (JP); Asao Uenodai, Wako (JP); Takuya Shirasaka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 952 days.

(21) Appl. No.: 11/922,991

(22) PCT Filed: Jun. 2, 2006

(86) PCT No.: PCT/JP2006/311104
§ 371 (c)(1),
(2), (4) Date: Dec. 27, 2007

(87) PCT Pub. No.: WO2007/000872
PCT Pub. Date: Jan. 4, 2007

(65) Prior Publication Data
US 2009/0115246 A1    May 7, 2009

(30) Foreign Application Priority Data
Jun. 27, 2005  (JP) .................................. 2005-187358

(51) Int. Cl.
*B60T 8/34* (2006.01)
*B60T 8/64* (2006.01)
*B60K 1/00* (2006.01)
(52) U.S. Cl. ...................... 303/151; 303/113.2; 180/65.1
(58) Field of Classification Search .................. 303/152, 303/163–169, 173–175, 149, 150, 151, 113.2; 180/65.1, 197
See application file for complete search history.

(56) References Cited

U.S. PATENT DOCUMENTS

| | | | | |
|---|---|---|---|---|
| 4,962,969 A | * | 10/1990 | Davis | 303/3 |
| 5,492,192 A | * | 2/1996 | Brooks et al. | 180/165 |
| 5,539,641 A | * | 7/1996 | Littlejohn | 701/70 |
| 6,033,041 A | * | 3/2000 | Koga et al. | 303/152 |
| 6,076,899 A | * | 6/2000 | Isella | 303/152 |
| 6,231,134 B1 | * | 5/2001 | Fukasawa et al. | 303/152 |
| 6,325,470 B1 | * | 12/2001 | Schneider | 303/152 |
| 6,709,075 B1 | * | 3/2004 | Crombez et al. | 303/152 |
| 2005/0103551 A1 | * | 5/2005 | Matsuno | 180/243 |

FOREIGN PATENT DOCUMENTS

| | | |
|---|---|---|
| JP | 04-150702 | 5/1992 |
| JP | 11-105688 | 4/1999 |
| JP | 2002-104156 | 4/2002 |
| JP | 2004-345393 | 12/2004 |

OTHER PUBLICATIONS

Chinese Office Action for Application No. 2006800198995, dated Sep. 4, 2009.

* cited by examiner

*Primary Examiner* — Bradley King
*Assistant Examiner* — Vishal Sahni
(74) *Attorney, Agent, or Firm* — Nelson Mullins Riley & Scarborough LLP; Anthony A. Laurentano

(57) ABSTRACT

An electric motor is coupled to driving wheels 2, 2. When a slippage of the driving wheels 2, 2 is detected, the electric motor 5 produces a regenerative torque to suppress the slippage of the driving wheels 2, 2. The regenerative torque is controlled in a variable manner according to an index parameter that indicates a road surface condition. Thus, when the slippage of the driving wheels occurs, the slippage of the driving wheels is suppressed according to the road surface condition by a regenerative operation of the electric motor coupled to the driving wheels.

4 Claims, 9 Drawing Sheets

TRACTION CONTROL DEVICE FOR VEHICLE

RELATED APPLICATIONS

This application is a 35 U.S.C. 371 national stage filing of International Application No. PCT/JP2006/311104, filed 2 Jun. 2006, which claims priority to Japan Patent Application No. 2005-187358 filed on 27 Jun. 2005 in Japan. The contents of the aforementioned applications are hereby incorporated by reference.

TECHNICAL FIELD

The present invention relates to a traction control device for a vehicle that has an electric motor for selectively applying a driving torque or a regenerative torque to a driving wheel.

BACKGROUND ART

There has been known a conventional traction control device that controls a slippage of a driving wheel of a vehicle by applying a regenerative torque (braking torque) to the driving wheel from an electric motor. In general, the device of this type makes the electric motor produce a constant regenerative torque when the driving wheel slips.

However, if the regenerative torque produced by the electric motor is constant, the regenerative torque easily becomes excessive or insufficient depending on the road surface condition. For example, in the case where the regenerative torque is relatively high, if the coefficient of friction of the road surface is relatively high, the slippage of the driving wheel tends to be abruptly eliminated, and thus, the acceleration of the vehicle tends to abruptly vary. On the other hand, in the case where the regenerative torque is relatively low, if the coefficient of friction of the road surface is relatively low, it tends to take a long time to eliminate the slippage of the driving wheel.

As the traction control device of this type, there has been known a traction control device disclosed in Japanese Patent Laid-Open No. 11-105688 (referred to as Patent Document 1, hereinafter). The traction control device disclosed in the Patent Document 1 controls a slippage of a driving wheel (brings a slip ratio of a driving wheel close to 0) using an electric motor coupled to the driving wheel and a friction brake device for the driving wheel when the slippage of the driving wheel is detected.

DISCLOSURE OF THE INVENTION

As described above, if the electric motor produces a constant regenerative torque when the slippage of the driving wheel occurs, the regenerative torque becomes excessive or insufficient depending on the road surface condition, and thus, it is difficult to always smoothly suppress the slippage of the driving wheel.

In view of such circumstances, an object of the present invention is to provide a traction control device capable of smoothly and quickly controlling a slippage of a driving wheel according to the road surface condition through a regenerative operation of an electric motor coupled to the driving wheel.

In order to attain the object, according to the present invention, there is provided a traction control device for a vehicle, comprising: an electric motor that is coupled to a driving wheel of the vehicle and is capable of carrying out a regenerative operation to produce a regenerative torque; and a means for detecting occurrence of a slippage of the driving wheel, the traction control device being configured so that, when the occurrence of the slippage of the driving wheel is detected, the traction control device makes the electric motor produce the regenerative torque to apply a braking force to the driving wheel, thereby suppressing the slippage of the driving wheel, in which the traction control device further comprises electric motor controlling means for controlling the regenerative torque produced by the electric motor when the occurrence of the slippage of the driving wheel is detected in a variable manner according to the value of a predetermined index parameter indicating a road surface condition (a first aspect of the present invention).

According to the first aspect of the present invention, when occurrence of a slippage of the driving wheel is detected, the regenerative torque produced by the electric motor is controlled by the electric motor controlling means in a variable manner according to the value of a predetermined index parameter indicating the road surface condition. Thus, the slippage of the driving wheel can be smoothly and quickly suppressed according to the road surface condition.

In the first aspect of the present invention, more preferably, the traction control device for a vehicle further comprises driving wheel speed detecting means for detecting the rotational speed of the driving wheel, and after the occurrence of the slippage of the driving wheel is detected, in a period at least until the detected value of the rotational speed of the driving wheel reaches a peak value, the electric motor controlling means makes the electric motor produce the regenerative torque while controlling the regenerative torque in a variable manner according to the value of the index parameter (a second aspect of the present invention).

According to the second aspect of the present invention, after the occurrence of the slippage of the driving wheel is detected, in a period at least until the rotational speed of the driving wheel (the detected value obtained by the driving wheel speed detecting means) reaches a peak value, the electric motor controlling means makes the electric motor produce the regenerative torque while controlling the regenerative torque in a variable manner according to the value of the predetermined index parameter indicating the road surface condition. Thus, the regenerative torque of the electric motor can be controlled to be suitable for the road surface condition from when the rotational speed of the driving wheel begins to increase due to the slippage thereof. In particular, according to the second aspect, even if the road surface condition is changed when the rotational speed of the driving wheel is increasing, the regenerative torque of the electric motor can be changed accordingly. Thus, it is possible to prevent the slippage of the driving wheel from being abruptly eliminated to cause an instantaneous braking force applied to the vehicle or the time required to suppress the slippage of the driving wheel (or to reduce the slip ratio of the driving wheel) from being excessively long. Therefore, according to the second aspect, the slippage of the driving wheel can be smoothly and quickly suppressed regardless of the road surface condition or a change thereof while avoiding abrupt elimination of the slippage of the driving wheel or the excessive length of time required to suppress the slippage of the driving wheel.

In this case, basically, the regenerative torque produced by the electric motor can be increased as the road surface condition indicated by the index parameter becomes more slippery (the coefficient of friction of the road surface becomes lower).

In the second aspect of the present invention, preferably, after the occurrence of the slippage of the driving wheel is detected, in a period from the point in time when the detected value of the rotational speed of the driving wheel increases and exceeds a predetermined first threshold until the rotational speed of the driving wheel decreases to a predetermined second threshold after reaching the peak value, the electric motor produces the regenerative torque while controlling the regenerative torque in a variable manner according to the value of the index parameter (a third aspect of the present invention).

According to the third aspect of the present invention, the pattern of a change in rotational speed of the driving wheel in which the rotational speed increases and then decreases can be controlled to be an appropriate pattern regardless of the road surface condition. Thus, the slippage of the driving wheel can be smoothly and quickly controlled more effectively regardless of the road surface condition.

As the index parameter in the first to third aspects of the present invention, the index parameters described below are preferably used, for example.

The traction control device for a vehicle further comprises means for detecting or estimating the acceleration of the vehicle, and in a period in which the electric motor produces the regenerative torque, the electric motor controlling means determines a requested torque of the electric motor, which is required to produce the detected or estimated acceleration of the vehicle, as a requested torque for traction control according to the acceleration and uses the determined requested torque for traction control as the index parameter (a fourth aspect of the present invention).

In the fourth aspect of the present invention, the acceleration (detected value or estimated value) of the vehicle when the slippage of the driving wheel occurs is substantially proportional to the driving force of the vehicle that can be produced by the friction between the driving wheel and the road surface. Thus, the road condition (the coefficient of friction of the road surface) is reflected in the requested torque for traction control determined according to the acceleration as described above. That is, basically, the requested torque for traction control decreases as the road surface becomes more slippery (the coefficient of friction of the road surface is lower).

Thus, if the requested torque for traction control is used as the index parameter, the regenerative torque of the electric motor can be appropriately controlled according to the road surface condition. The acceleration of the vehicle can be directly detected with an acceleration sensor. Alternatively, however, the rotational speed of a driven wheel of the vehicle may be detected, and the acceleration of the vehicle may be estimated from the detected value, for example. The driven wheel does not basically slip, so that the rotational speed of the driven wheel is substantially proportional to the actual speed of the vehicle. Therefore, the acceleration of the vehicle can be estimated from the detected value of the rotational speed of the driven wheel.

Furthermore, preferably, after the period in which the electric motor produces the regenerative torque is ended, a requested torque (requested driving torque) of the electric motor is determined according to a feedback control law so that the rotational speed (detected value) of the driving wheel converges to a predetermined target speed (a speed that is close to the rotational speed of the driven wheel and is higher than the rotational speed by a predetermined amount), and the electric motor is controlled according to the requested driving torque. In this case, in the fourth aspect, it is preferred that the requested torque for traction control (more specifically, the requested torque for traction control determined immediately before the period in which the electric motor produces the regenerative torque is ended) is designated as the initial value of the requested torque of the electric motor after the end of the period, and the requested torque of the electric motor is determined from the initial value according to the feedback control law.

Furthermore, in the case where the traction control device for a vehicle further comprises means for detecting or estimating the acceleration of the vehicle, in a period in which the electric motor produces the regenerative torque, the electric motor controlling means may use the detected or estimated acceleration as the index parameter (a fifth aspect of the present invention).

As described above, the acceleration (detected value or estimated value) of the vehicle when the slippage of the driving wheel occurs is substantially proportional to the driving force of the vehicle that can be produced by the friction between the driving wheel and the road surface. Thus, the acceleration of the vehicle decreases as the road surface becomes more slippery (the coefficient of friction of the road surface becomes lower). Thus, according to the fifth aspect in which the acceleration (detected value or estimated value) of the vehicle is used as the index parameter, the regenerative torque of the electric motor can be appropriately controlled according to the road surface condition, as in the fourth aspect of the present invention. The acceleration of the vehicle can be directly detected with an acceleration sensor as in the fourth aspect of the present invention. However, the rotational speed of a driven wheel of the vehicle may be detected, and the acceleration of the vehicle may be estimated from the detected value, for example.

Alternatively, the traction control device may further comprise means for estimating the coefficient of friction of a road surface on which the vehicle runs, and in a period in which the electric motor produces the regenerative torque, the electric motor controlling means may use the estimated coefficient of friction as the index parameter (a sixth aspect of the present invention).

According to the sixth aspect of the present invention, since the estimated value of the coefficient of friction of the road surface is used as the index parameter, as in the fourth or fifth aspect, the regenerative torque of the electric motor can be appropriately controlled according to the road surface condition. There are various known methods for estimating the coefficient of friction of the road surface, and the coefficient of friction can be estimated by any of those various methods.

In the first to third aspects of the present invention, preferably, the traction control device further comprises means for determining a requested torque of the electric motor, as an operator-requested torque, according to the amount of manipulation of an accelerator of the vehicle by an operator of the vehicle, and in a period in which the electric motor produces the regenerative torque, the electric motor controlling means controls the regenerative torque in a variable manner according to the values of the determined operator-requested torque and the index parameter (a seventh aspect of the present invention). Basically, the determined operator-requested torque increases as the amount of manipulation of the accelerator (for example, the amount of depression of the accelerator pedal) increases.

According to this aspect, the regenerative torque of the electric motor is determined by taking into account not only the road surface condition but also the amount of manipulation of the accelerator by the operator. Thus, for example, if a slippage of a driving wheel occurs in a state where the amount of manipulation of the accelerator is large (the operator-requested torque is high) and the slip ratio of the driving wheel tends to be high, the regenerative torque of the electric motor can be increased to quickly suppress the slippage of the driving wheel. On the other hand, if the slippage of the driving wheel occurs in a state where the amount of manipulation of the accelerator is relatively small (the operator-requested torque is low), and the slip ratio of the driving wheel is relatively low, the regenerative torque of the electric motor can be decreased to avoid abrupt elimination of the slippage of the driving wheel. In controlling the regenerative torque of the electric motor, basically, the regenerative torque can be increased as the operator-requested torque increases or the road surface condition indicated by the index parameter becomes more slippery.

Furthermore, in the seventh aspect, preferably, after the period in which the electric motor produces the regenerative torque is ended, a requested torque of the electric motor is determined according to a feedback control law so that the rotational speed of the driving wheel converges to a predetermined target speed as in the third aspect described above, and the electric motor is controlled with reference to the smaller one of the requested torque and the operator-requested torque as the target output torque of the electric motor.

More specifically, in the seventh aspect of the present invention, the traction control device further comprises means for detecting or estimating the acceleration of the vehicle, and in the period in which the electric motor produces the regenerative torque, the electric motor controlling means determines a requested torque of the electric motor, which is required to produce the detected or estimated acceleration of the vehicle, as a requested torque for traction control according to the acceleration, uses the determined requested torque for traction control as the index parameter, and controls the regenerative torque in a variable manner according to the difference between the determined operator-requested torque and the requested torque for traction control (an eighth aspect of the present invention). The relationship between the requested torque for traction control and the road surface condition in the eighth aspect of the present invention is the same as that described in the fourth aspect of the present invention.

In this case, the difference between the operator-requested torque and the requested torque for traction control (the operator-requested torque minus the requested torque for traction control) increases as the operator-requested torque increases or the road surface becomes more slippery (that is, the requested torque for traction control decreases). Thus, for example, by controlling the electric motor in such a manner that the regenerative torque of the electric motor increases as the difference described above increases, the slippage of the driving wheel can be suppressed according to the manipulation of the accelerator by the operator and the road surface condition. Even if the road surface is slippery, if the amount of manipulation of the accelerator immediately before the slippage of the driving wheel occurs is relatively small, the regenerative torque at the start of the regenerative operation of the electric motor can be reduced compared with the case where the amount of manipulation of the accelerator is large. Thus, the possibility that the torque produced by the electric motor abruptly changes from the driving torque to a high regenerative torque can be reduced, and the load on the electric motor can be reduced.

Furthermore, in the seventh aspect of the present invention, the traction control device may further comprise means for detecting or estimating the acceleration of the vehicle, and in the period in which the electric motor produces the regenerative torque, the electric motor controlling means may use the detected or estimated acceleration as the index parameter, determines a requested torque of the electric motor, which is required to produce the acceleration of the vehicle, as an acceleration-based torque according to the acceleration, and control the regenerative torque in a variable manner according to the difference between the determined operator-requested torque and the acceleration-based torque (a ninth aspect of the present invention).

In this case, the difference between the operator-requested torque and the acceleration-based torque (the operator-requested torque minus the acceleration-based torque) increases as the operator-requested torque increases or the road surface becomes more slippery (that is, the acceleration of the vehicle and, therefore, the acceleration-based torque decrease). Thus, according to the ninth aspect, the same advantages as in the eighth aspect can be provided.

Alternatively, in the seventh aspect of the present invention, the traction control device may further comprise means for estimating the coefficient of friction of a road surface on which the vehicle runs, and in the period in which the electric motor produces the regenerative torque, the electric motor controlling means may use the estimated coefficient of friction as the index parameter, determine a requested torque of the electric motor, which is requested according to the coefficient of friction, as a coefficient-of-friction-based torque by multiplying the coefficient of friction by a predetermined conversion coefficient, and control the regenerative torque in a variable manner according to the difference between the determined operator-requested torque and the coefficient-of-friction-based torque (a tenth aspect of the present invention).

In this case, the difference between the operator-requested torque and the coefficient-of-friction-based torque (the operator-requested torque minus the coefficient-of-friction-based torque) increases as the operator-requested torque increases or the road surface becomes more slippery (that is, the coefficient of friction of the road surface and, therefore, the coefficient-of-friction-based torque decrease). Thus, according to the tenth aspect, the same advantages as in the eighth aspect can be provided.

BEST MODE FOR CARRYING OUT THE INVENTION

A first embodiment of the present invention will be described with reference to FIGS. 1 to 8.

Figure 1:
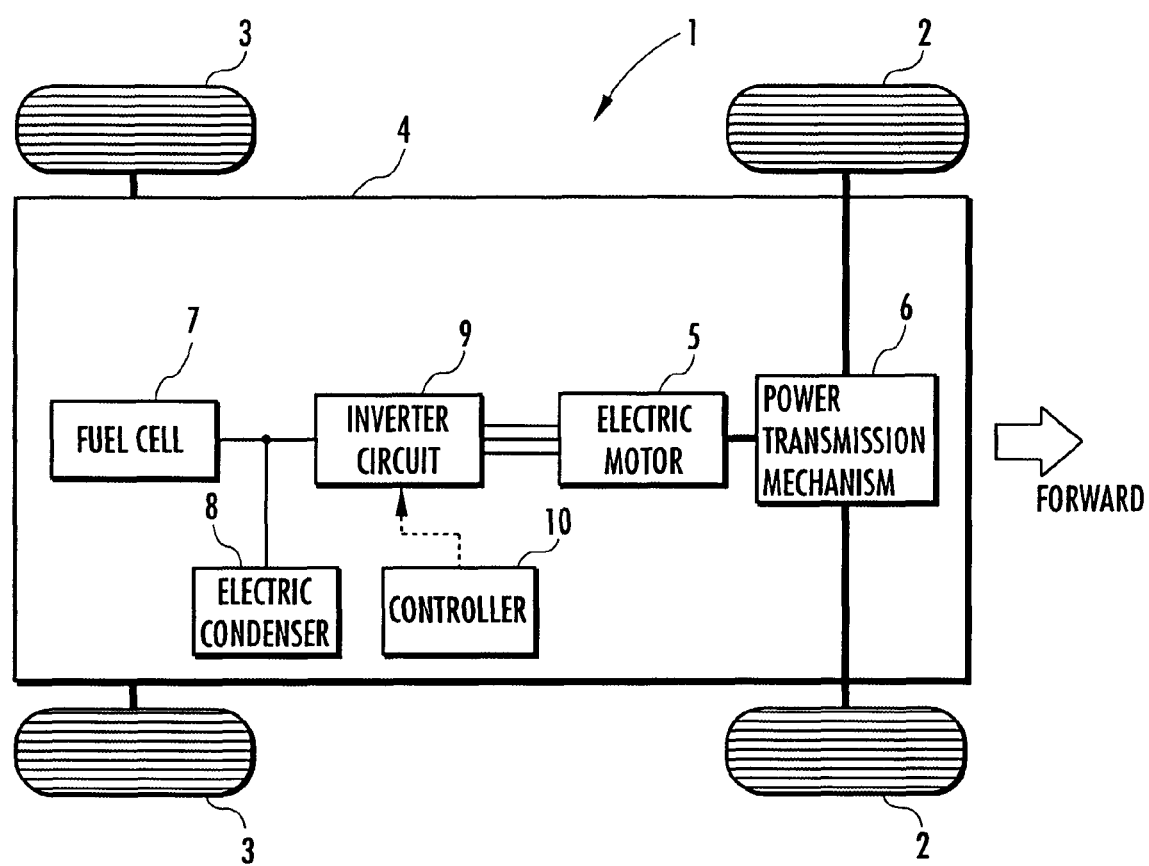
FIG. 1 is a schematic block diagram showing a configuration of a vehicle (electrically powered vehicle) according to a first embodiment of the present invention.

A vehicle in this embodiment is an electrically powered vehicle (electric automobile) that uses a fuel cell as a main energy source, for example. FIG. 1 is a schematic diagram showing a configuration of the electrically powered vehicle.

As shown in this drawing, an electrically powered vehicle 1 has a pair of left and right front wheels 2, 2, which are driving wheels, and a lateral pair of rear wheels 3, 3, which are driven wheels. An electric motor 5 serving as a propulsive force source for the vehicle 1 is mounted on a body 4 of the vehicle 1. A driving shaft 5a of the electric motor 5 is coupled to the driving wheels (front wheels) 2, 2 via a power transmission mechanism 6, which is composed of a transmission, a differential gear device and the like. Thus, a torque produced by the electric motor 5 is transferred to the driving wheels 2, 2 via the power transmission mechanism 6. The electric motor 5 is capable of selectively carrying out a power running operation and a regenerative operation. The electric motor 5 produces a driving torque as a propulsive force for the vehicle 1 when carrying out the power running operation and produces a regenerative torque as a braking force for the vehicle when carrying out the regenerative operation.

While the front wheels 2, 2 are the driving wheels, and the rear wheels 3, 3 are the driven wheels in this embodiment, the rear wheels 3, 3 may be driving wheels, and the front wheels 2, 2 may be driven wheels.

A fuel cell 7 serving as a main power supply for the electric motor 5 and an electric condenser 8 serving as an auxiliary power supply are mounted on the body 4. The fuel cell 7 and the electric condenser 8 are electrically connected to the electric motor 5 via an inverter circuit 9. The electric condenser 8 is constituted by a secondary battery or a capacitor.

In addition, a controller 10 that controls the operation of the electric motor 5 or the like is mounted on the body 4. The controller 10 is constituted by an electronic circuit unit including a microcomputer and the like and controls the operation of the electric motor 5 by controlling the energizing current flowing between the fuel cell 7 or electric condenser 8 and the electric motor 5 via the inverter circuit 9. When the electric motor 5 carries out the power running operation, power is supplied from the fuel cell 7 or electric condenser 8 to the electric motor 5 via the inverter circuit 9. On the other hand, when the electric motor 5 carries out the regenerative operation, the electric condenser 8 is charged with the power generated by the electric motor 5 via the inverter circuit 9. The controller 10 corresponds to electric motor controlling means according to the present invention.

Figure 2:
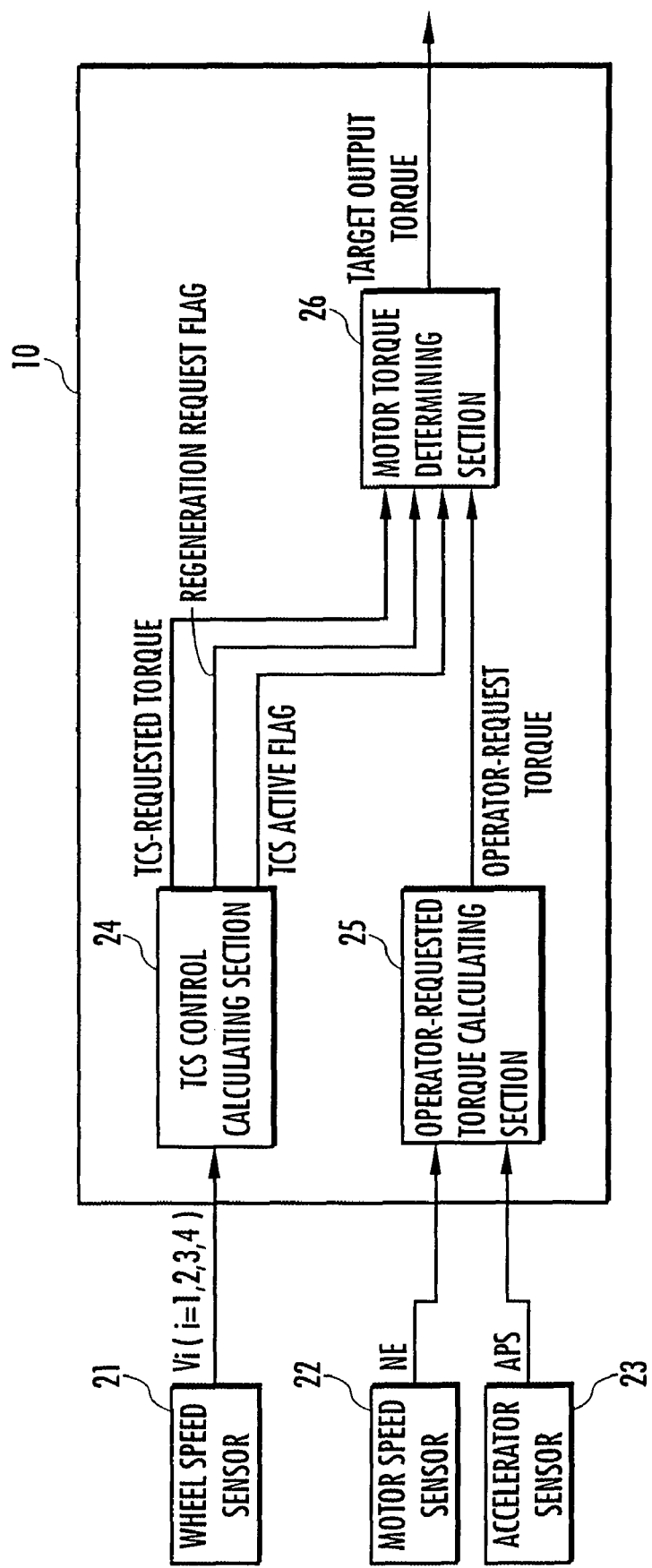
FIG. 2 is a schematic block diagram showing a functional configuration of a controller provided in the vehicle shown in FIG. 1.

Referring to FIG. 2, main processing features of the controller 10 will be schematically described. FIG. 2 is a block diagram showing processing features of the controller 10 and sensors associated with the processing features.

As shown in this drawing, the vehicle 1 has a wheel speed sensor 21 that detects the rotational speed Vi (i=1, 2, 3, 4) of each wheel 2, 3, a motor speed sensor 22 that detects the rotational speed NE of the motor, and an accelerator sensor 23 that detects the amount of manipulation of an accelerator pedal (not shown) (or in other words, the amount of depression of an accelerator pedal, referred to as accelerator manipulation amount hereinafter) APS by an operator of the vehicle 1. Outputs (detected values) of these sensors 21, 22 and 23 are input to the controller 10. In the description of this embodiment, reference characters V1 and V2 denote the rotational speeds of the left-hand and right-hand driving wheels (front wheels) 2, 2, respectively, and reference characters V3 and V4 denote the rotational speeds of the left-hand and right-hand driven wheels (rear wheels) 3, 3, respectively. The wheel speed sensor 21 functions as driving wheel speed detecting means according to the present invention.

The controller 10 has a TCS control calculating section 24, an operator-requested torque calculating section 25, and a motor torque determining section 26 as the processing features thereof. The output of the motor speed sensor 22 (detected value of NE) and the output of the accelerator sensor 23 (detected value of APS) are supplied to the operator-requested torque calculating section 25. The output of the wheel speed sensor 21 (detected value of Vi) is supplied to the TCS control calculating section 24.

The operator-requested torque calculating section 25 determines the operator-requested torque from the detected value of the rotational speed NE of the electric motor 5 and the detected value of the accelerator manipulation amount APS based on a previously defined map or the like. Then, the operator-requested torque calculating section 25 outputs the determined operator-requested torque to the motor torque determining section 26. The operator-requested torque means a torque that an operator requests the electric motor 5 to produce through manipulation of the accelerator pedal (a request value of the driving torque). Basically, the operator-requested torque increases as the accelerator manipulation amount APS increases.

Based on the detected values of the rotational speed Vi of the wheels 2, 2, 3, 3, the TCS control calculating section 24 determines the requested torque of the electric motor 5 for suppressing a slippage of the driving wheels 2, 2 for reducing the slip ratio of the driving wheels 2, 2) as a TCS-requested torque while detecting the slippage of the driving wheels 2, 2. Then, the TCS control calculating section 24 outputs the determined TCS-requested torque to the motor torque determining section 26. The TCS-requested torque is a positive torque in the direction of driving. The TCS-requested torque corresponds to a requested torque for traction control according to the present invention.

In addition, the TCS control calculating section 24 determines the value of a TCS active flag, which indicates whether a calculation processing for suppressing a slippage of the driving wheels 2, 2 (referred to as TCS calculation processing hereinafter) is carried out or not, and the value of a regeneration request flag, which indicates whether the regenerative operation of the electric motor 5 is needed or not. The TCS control calculating section 24 outputs the determined flag values to the motor torque determining section 26. In the following description, the values of the TCS active flag and the regeneration request flag are represented by ON and OFF. Specifically, if the value of the TCS active flag is ON, it means that the TCS calculation processing is carried out, and if the value of the TCS active flag is OFF, it means that the TCS calculation processing is not carried out. Similarly, if the value of the regeneration request flag is ON, it means that the regenerative operation of the electric motor 5 is needed, and if the value of the regeneration request flag is OFF, it means that the regenerative operation of the electric motor 5 is not needed.

The motor torque determining section 26 determines a target output torque of the electric motor 5 based on the operator-requested torque, the TCS-requested torque, the TCS active flag and the regeneration request flag input thereto. Then, the motor torque determining section 26 controls the inverter circuit 9 so that the electric motor 5 produces the target output torque. More specifically, the motor torque determining section 26 determines a current command value and an operation mode (the power running operation or the regenerative operation) of the electric motor 5 according to the target output torque. Then, the motor torque determining section 26 controls an energizing current to the electric motor 5 via the inverter circuit 9 so that the current specified by the current command value is supplied to the electric motor 5 in the determined operation mode. The target output torque determined by the motor torque determining section 26 is any of the driving torque and the regenerative torque. In this embodiment, the driving torque is a positive value, and the regenerative torque is a negative value.

Now, the operation of the device according to this embodiment will be described by centrally focusing on more detailed control processing of the controller 10. The controller 10 makes the operator-requested torque calculating section 25, the TCS control calculating section 24 and the motor torque determining section 26 sequentially carry out their respective processings in a predetermined control processing cycle.

In each control processing cycle, the operator-requested torque calculating section 25 first carries out its processing as described above, and the operator-requested torque is determined from the detected value of the rotational speed NE of the electric motor 5 and the detected value of the accelerator manipulation amount APS.

Then, the TCS control calculating section 24 carries out its processing. In this step, the TCS control calculating section 24 carries out calculation of the TCS-requested torque and setting of the values of the TCS active flag and the regeneration request flag through a process shown in the flowchart of FIG. 3.

Specifically, first, in STEP 301, the TCS control calculating section 24 reads in the output of the wheel speed sensor 21, that is, the detected values of the rotational speed Vi (i=1, 2, 3, 4) of the wheels 2, 2, 3, 3.

Then, in STEP 302, a driving wheel speed and a driven wheel speed are calculated from the detected values of Vi. The term "driving wheel speed" refers to a vehicle speed estimated from the rotational speeds V1 and V2 of the driving wheels 2, 2 (the vehicle speed estimated on the assumption that no slippage of the driving wheels 2, 2 occurs). The driving wheel speed is calculated by multiplying an average of the rotational speeds V1 and V2 by a preset value of the effective radius of the driving wheels 2, 2 (the preset value is previously stored in a memory (not shown)), for example. The term "driven wheel speed" refers to a vehicle speed estimated from the rotational speeds V3 and V4 of the driven wheels 3, 3 (the vehicle speed estimated on the assumption that no slippage of the driven wheels 3, 3 occurs). As with the driving wheel speed, the driven wheel speed is calculated by multiplying an average of the rotational speeds V3 and V4 by a preset value of the effective radius of the driven wheels 3, 3, for example. In this case, since the driven wheels 3, 3 basically do not slip, the driven wheel speed is substantially equal to the actual vehicle speed. If the driving wheels 2, 2 do not slip, the driving wheel speed is substantially equal to the actual vehicle speed or the driven wheel speed. However, if the slippage of the driving wheels 2, 2 occurs, the driving wheel speed is higher than the actual vehicle speed or the driven wheel speed.

The driven wheel speed corresponds to the estimated value of the actual speed of the vehicle 1 (the speed in the direction of travel). Therefore, in the case where the actual speed of the vehicle 1 is detected by an appropriate sensor, the detected value can be used instead of the driven wheel speed.

Then, in STEP 303, thresholds "a", "b", "c" and "d" and a target driving wheel speed illustrated in FIG. 4(d) are set. FIGS. 4(a) and 4(b) are graphs showing an exemplary temporal change of the value of the TCS flag determined by the TCS control calculating section 24 and an exemplary temporal change of the value of the regeneration request flag determined by the TCS control calculating section 24, respectively. FIG. 4(c) is a graph showing exemplary temporal changes of the target output torque, the operator-requested torque and the TCS-requested torque of the electric motor 5. FIG. 4(d) is a graph showing exemplary temporal changes of the driving wheel speed and the driven wheel speed.

Referring to FIG. 4(d), the threshold "a" is a threshold for designating the timing of switching of the value of the TCS flag from OFF to ON (the timing of start of the TCS calculation processing) (or in other words, a threshold for detecting occurrence of a slippage of the driving wheels 2, 2). The threshold "b" is a threshold for designating the timing of switching of the value of the regeneration request flag from OFF to ON. The threshold "c" is a threshold for designating the timing of switching of the value of the regeneration request flag from ON to OFF. The threshold "d" is a threshold for designating the timing of the value of the TCS flag from ON to OFF (the timing of an end of the TCS calculation processing). These thresholds "a" to "d" are to be compared with the driving wheel speed and are determined according to the driven wheel speed determined in STEP 302. Specifically, each of the thresholds "a" to "d" is set at a predetermined constant value when the driven wheel speed lies within a sufficiently low speed range (a speed range lower than a predetermined speed). If the driven wheel speed becomes higher than the low speed range, the thresholds a to d are set to a value provided by adding a predetermined value (a different predetermined value every each of thresholds "a" to "d") to the driven wheel speed.

The target driving wheel speed means a target value to which the driving wheel speed is made to converge when a slippage of the driving wheels 2, 2 occurs. As with the thresholds "a" to "d", the target driving wheel speed is set according to the driven wheel speed determined in STEP 302. Specifically, the target driving wheel speed is set at a predetermined constant value when the driven wheel speed lies within a sufficiently low speed range (a speed range lower than a predetermined speed). If the driven wheel speed becomes higher than the low speed range, the target driving wheel speed is set at a sum of the driven wheel speed and a predetermined value. The target driving wheel speed is set so that the slip ratio of the driving wheels 2, 2 (ratio of the difference between the driving wheel speed and the driven wheel speed with respect to the driven wheel speed) is sufficiently low. In this embodiment, for any value of the driven wheel speed, the thresholds "a" to "d" and the target driving wheel speed are related to each other in terms of magnitude as follows: driven wheel speed<threshold "d"<threshold "a"<target driving wheel speed<threshold "b"<threshold "c".

Comparing the driving wheel speed with each of the thresholds "a" to "d" is equivalent to comparing the average of the detected values of the rotational speeds V1 and V2 of the driving wheels 2, 2 with a threshold corresponding to each of the thresholds "a" to "d" (the threshold is obtained by dividing each of the thresholds "a" to "d" by the effective radius of the driving wheels 2, 2). Furthermore, making the driving wheel speed converge to the target driving wheel speed is equivalent to making the average of the detected values of the rotational speeds V1 and V2 of the driving wheels 2, 2 converge to a target rotational speed of the driving wheels 2, 2 corresponding to the target driving wheel speed (the target rotational speed is obtained by dividing the target driving wheel speed by the effective radius of the driving wheels 2, 2).

Referring back to FIG. 3, following the processing in STEP 303, in STEP 304, the current value of the TCS active flag is checked. The initial values of the TCS active flag and the regeneration request flag (the values at the time when the controller 10 is activated) are OFF.

If the TCS active flag is OFF, the driving wheel speed determined in STEP 302 is compared with the threshold "a" set in STEP 303 (STEP 305). This comparison is carried out to detect occurrence of a slippage of the driving wheels 2, 2. If the driving wheel speed is equal to or lower than the threshold "a", it is determined that no slippage of the driving wheels 2, 2 occurred. In this case, in STEP 306, the TCS-requested torque is set at a predetermined maximum value (MAX), and the processing by the TCS control calculating section 24 (the processing of the current control processing cycle) is ended. In this case, the values of the TCS active flag and the regeneration request flag are maintained at OFF.

The maximum value of the TCS-requested torque in STEP 306 is the maximum driving torque that the electric motor 5 can produce. While the TCS-requested torque is set at the maximum value for the sake of convenience in STEP 306 in this embodiment, the TCS-requested torque does not always need to be set at the maximum value and can be set at any value.

If it is determined that the driving wheel speed is higher than the threshold "a" in the comparison in STEP 305, it is determined that a slippage of the driving wheels 2, 2 occurred. In this case, in STEP 307, the value of the TCS active flag is set at ON (or in other words, the value of the TCS active flag is switched from OFF to ON). Furthermore, in STEP 308, the initial value of the TCS-requested torque, which is used to determine the TCS-requested torque by a feedback control processing described later, is determined. Specifically, the initial value of the TCS-requested torque is determined from the acceleration obtained as the temporal differential value of the driven wheel speed (referred to as driven wheel acceleration, which means an estimated acceleration of the vehicle 1 in the longitudinal direction thereof) based on a preset table shown by the graph of FIG. 5.

Figure 5:
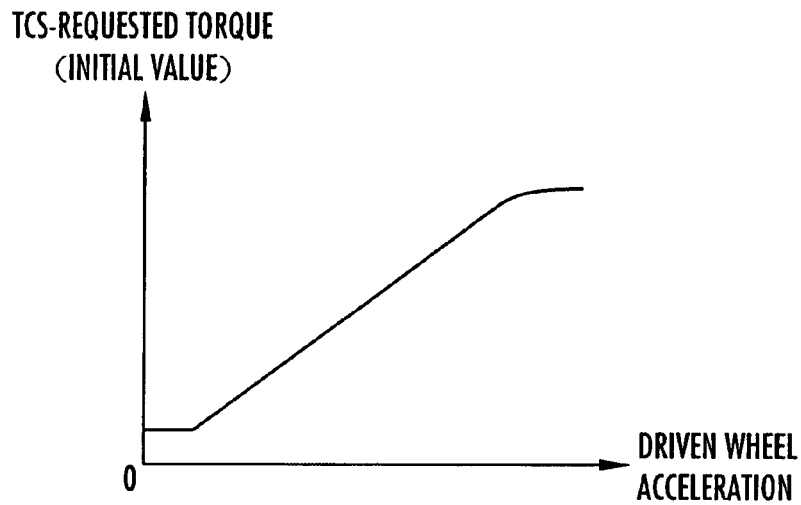
FIG. 5 is a graph showing a table for determining the TCS-requested torque during a regenerative operation of an electric motor.
Figure 6:
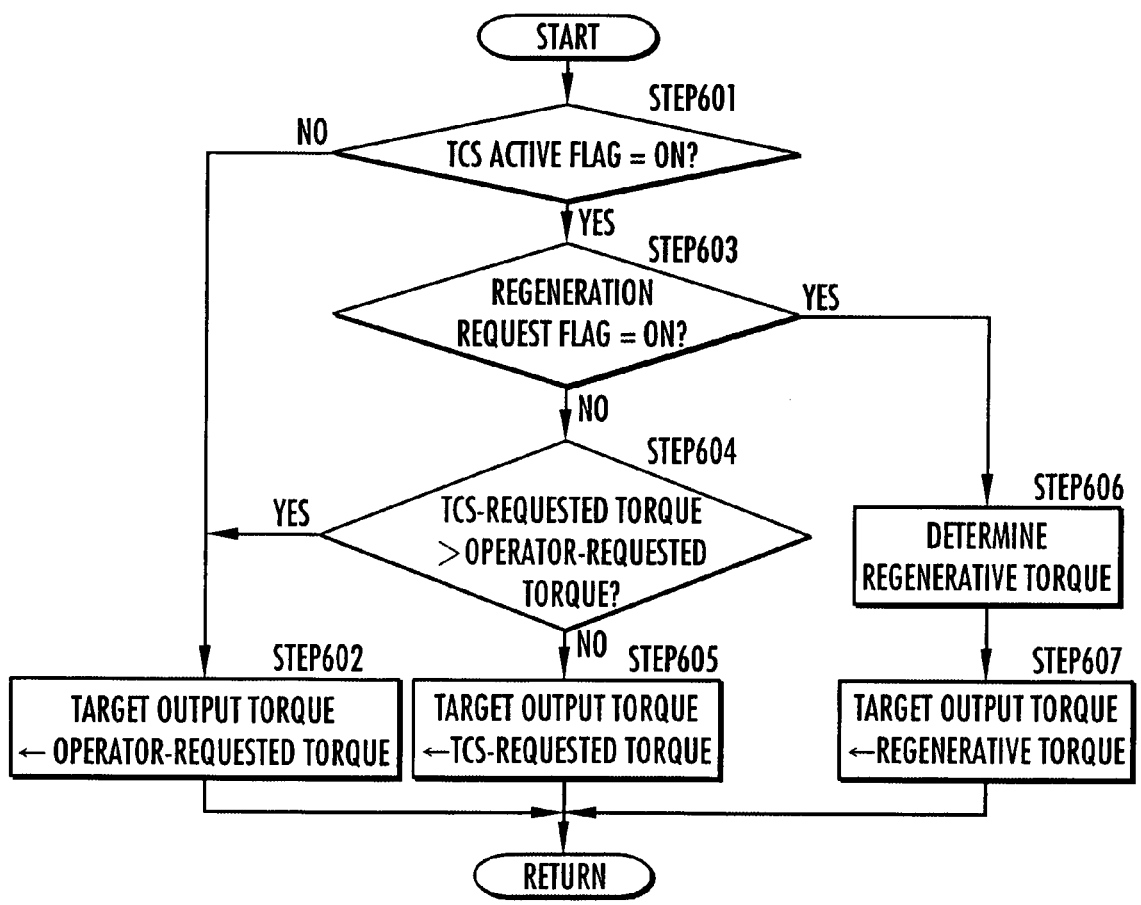
FIG. 6 is a flowchart showing a process carried out by a motor torque determining section shown in FIG. 2.

The table of FIG. 5 is configured so that the initial value of the TCS-requested torque increases substantially linearly as the driven wheel acceleration increases. That is, the table of FIG. 5 is configured so that the initial value of the TCS-requested torque is substantially proportional to the driven wheel acceleration. Although not shown in detail, the table of FIG. 5 is actually set for each transmission gear ratio of the transmission of the power transmission mechanism 6. In this case, the table for each transmission gear ratio is set so that the rate of a change of the initial value of the TCS-requested torque with respect to the change of the driven wheel acceleration (that is, the slope of the graph) decreases as the transmission gear ratio of the transmission of the power transmission mechanism 6 becomes greater (or in other words, as the transmission gear ratio becomes lower).

The initial value of the TCS-requested torque determined as described above means a requested torque (driving torque) of the electric motor 5 that is required to produce an acceleration of the vehicle 1 equal to the value of the driven wheel acceleration. In other words, the initial value of the TCS-requested torque means a requested torque of the electric motor 5 that is required to apply a driving force equivalent to the driven wheel acceleration (a driving force determined by multiplying the driven wheel acceleration by the weight of the vehicle 1) to the driving wheels 2, 2. In other words, the initial value of the TCS-requested torque determined as described above is a driving torque of the electric motor 5 that can be transferred to the driving wheels 2, 2 without causing an excessive slippage of the driving wheels 2, 2.

In this embodiment, the driven wheel acceleration is used to determine the initial value of the TCS-requested torque. However, the acceleration of the vehicle 1 in the longitudinal direction thereof may be detected by an acceleration sensor mounted on the body 4, and the initial value of the TCS-requested torque may be determined using the detected value of the acceleration, instead of the driven wheel acceleration. Furthermore, the initial value of the TCS-requested torque may be determined by taking into account not only the acceleration of the vehicle 1 in the longitudinal direction thereof but also the acceleration of the vehicle 1 in the lateral direction thereof. For example, of a candidate initial value of the TCS-requested torque determined from a composite acceleration of the longitudinal acceleration and the lateral acceleration based on a data table or the like and a candidate initial value of the TCS-requested torque determined from the longitudinal acceleration based on the table of FIG. 5, a larger one may be selected as the initial value of the TCS-requested torque in STEP 307. In this case, the lateral acceleration can be detected by an acceleration sensor. As the longitudinal acceleration, the driven wheel acceleration or the detected value of the acceleration sensor can be used.

In STEP 309, the initial value determined in STEP as described above is designated as the TCS-requested torque (the TCS-requested torque of the current control processing cycle) (STEP 309), and the processing by the TCS control calculating section 24 (the processing of the current control processing cycle) is ended. In this case, the value of the regeneration request flag is maintained at OFF.

If it is determined in STEP 304 that the value of the TCS active flag is ON, in STEP 310, it is determined whether or not the current driving wheel speed (the driving wheel speed determined in STEP 302) is higher than the threshold "b", and the rate of a change of the driving wheel speed (the rate of a change per unit time) is positive. If the rate of the change of the driving wheel speed is positive, it means that the driving wheel speed is increasing. Therefore, when the driving wheel speed increases and exceeds the threshold "b", the result of determination in STEP 310 is YES. The threshold "b" corresponds to a first threshold according to the present invention.

If the result of determination in STEP 310 is YES, in STEP 311, the current value of the regeneration request flag is checked. If it is determined that the value of the regeneration request flag is OFF, the value of the regeneration request flag is switched from OFF to ON in STEP 312, and then, the process proceeds to STEP 313 and STEP 314. If it is determined in STEP 311 that the value of the regeneration request flag is ON, the processing of STEP 312 is omitted (the value of the regeneration request flag is maintained at ON), and the process proceeds to STEP 313 and STEP 314.

In STEP 313 and STEP 314, the same processings as those in STEP 308 and STEP 309 are carried out, respectively, and the TCS-requested torque is set at the initial value. Then, the processing by the TCS control calculating section 24 (the processing of the current control processing cycle) is ended. In this case, the value of the TCS active flag is maintained at ON.

If the result of determination in STEP 310 is NO, in STEP 315, the current value of the regeneration request flag is checked. If it is determined that the value of the regeneration request flag is ON, in STEP 316, the current driving wheel speed (the driving wheel speed determined in STEP 302) is compared with the threshold "c". The threshold "c" corresponds to a second threshold according to the present invention. If it is determined in this comparison that the driving wheel speed is equal to or higher than the threshold "c", the processings of STEPS 313 and 314 are carried out to set the TCS-requested torque at the initial value, and then, the processing by the TCS control calculating section 24 (the processing of the current control processing cycle) is ended. In this case, the TCS active flag and the regeneration request flag are both maintained at ON.

On the other hand, if it is determined in the comparison in STEP 316 that the driving wheel speed is lower than the threshold "c", the process proceeds to STEP 317, and the value of the regeneration request flag is switched from ON to OFF. Then, in STEP 318, the current value of the TCS-requested torque is determined according to a feedback control law so that the driving wheel speed converges to the target driving wheel speed set in STEP 303, and then, the processing by the TCS control calculating section 24 (the processing of the current control processing cycle) is ended. In this case, the value of the TCS active flag is maintained at ON.

In this embodiment, the feedback control law used in STEP 318 is a PID control law. Thus, the TCS-requested torque is determined by multiplying the difference between the driving wheel speed determined in STEP 302 and the target driving wheel speed set in STEP 303, an integral value of the difference and a differential value of the difference by a predetermined gain and summing the products. In this case, the initial value of the TCS-requested torque finally determined in STEP 309 or STEP 314 is designated as the initial value of an integral term of the PID control law.

If it is determined in STEP 315 that the current value of the regeneration request flag is OFF, in STEP 319, the current driving wheel speed is compared with the threshold "d". If the driving wheel speed is equal to or higher than the threshold "d", the processing of STEP 318 is carried out, the TCS-requested torque is determined according to the feedback control law, and the processing by the TCS control calculating section 24 (the processing of the current control processing cycle) is ended. In this case, the value of the TCS active flag is maintained at ON, and the value of the regeneration request flag is maintained at OFF.

If it is determined in the comparison of STEP 319 that the driving wheel speed is lower than the threshold "d", in STEP 320, the value of the TCS active flag is switched from ON to OFF. Furthermore, in STEP 321, the processing as that in STEP 306 is carried out, and the current value of the TCS-requested torque is set at the maximum value (MAX). Then, the processing by the TCS control calculating section 24 (the processing of the current control processing cycle) is ended. In this case, the value of the regeneration request flag is maintained at OFF. In this embodiment, in STEP 320, the TCS-requested torque is set at the maximum value for the sake of convenience. However, as with STEP 306, the TCS-requested torque does not always need to be set at the maximum value and can be set at any value.

The processing carried out by the TCS control calculating section 24 has been described above.

Then, the motor torque determining section 26 carries out the processing thereof. In this step, the motor torque determining section 26 determines a target output torque of the electric motor 5 through the process shown in the flowchart of FIG. 6.

First, in STEP 601, the value of the TCS active flag is checked. If it is determined that the value of the TCS active flag is OFF, the process proceeds to STEP 602, and the operator-requested torque determined by the operator-requested torque calculating section 25 is designated as the target output torque. Then, the processing by the motor torque determining section 26 of the current control processing cycle is ended.

If it is determined in STEP 601 that the value of the TCS active flag is ON, in STEP 603, the value of the regeneration request flag is checked. If it is determined that the value of the regeneration request flag is OFF, in STEP 604, the TCS-requested torque and the operator-requested torque are compared with each other. If it is determined in this comparison that the TCS-requested torque is higher than the operator-requested torque, the processing of STEP 602 is carried out, and the operator-requested torque is designated as the target output torque. If the TCS-requested torque is equal to or lower than the operator-requested torque, in STEP 605, the TCS-requested torque is designated as the target output torque. When the value of the TCS active flag is ON, and the value of the regeneration request flag is OFF, the lower of the operator-requested torque and the TCS-requested torque is designated as the target output torque in STEP 602 or STEP 605.

Figure 7:
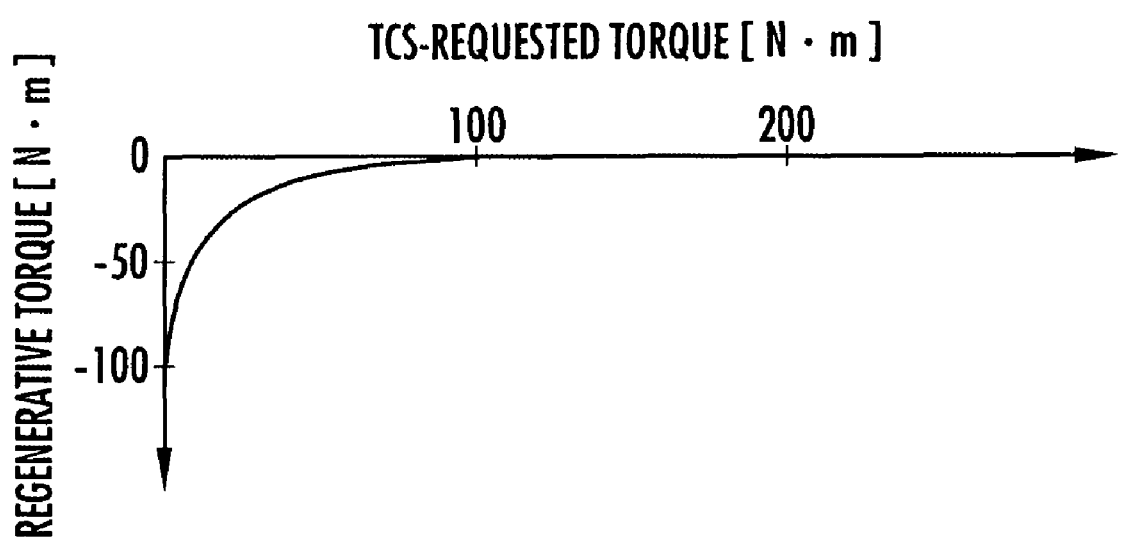
FIG. 7 is a graph showing a table for determining a regenerative torque of the electric motor.

If it is determined in STEP 603 that the value of the regeneration request flag is ON, in STEP 606, a regenerative torque of the electric motor 5 is determined in order that the electric motor 5 carries out the regenerative operation. The determined regenerative torque is variable according to the value of a predetermined index parameter indicating the road surface condition. In this embodiment, the TCS-requested torque determined by the TCS control calculating section 24 when the value of the regeneration request flag is ON as described above is used as the index parameter indicating the road surface condition. From the value of the TCS-requested torque, the regenerative torque of the electric motor 5 is determined based on a preset table shown in FIG. 7. The table of FIG. 7 is configured so that, in a range of the TCS-requested torque lower than a predetermined value, the regenerative torque increases in magnitude as the TCS-requested torque decreases. Since the TCS-requested torque (initial value) is determined when the value of the regeneration request flag is ON as described above, lower TCS-requested torques mean that the road surface condition is more likely to cause a slippage of the driving wheels 2, 2 (the coefficient of friction of the road surface is lower). Thus, the magnitude of the regenerative torque determined based on the table of FIG. 7 increases as the road surface becomes more slippery.

Furthermore, in this embodiment, the TCS-requested torque in the case where the value of the regeneration request flag is ON is determined according to the driven wheel acceleration (or the detected value of the acceleration sensor) as described above. As a result, in STEP 606, the regenerative torque is determined according to the acceleration of the vehicle 1.

Then, in STEP 607, the regenerative torque determined as described above is designated as the target output torque. Then, the processing by the motor torque determining section 26 of the current control processing cycle is ended.

Once the target output torque is determined in this way, the controller 10 adjusts the torque produced by the electric motor 5 to the target output torque via the inverter circuit 9 as described above.

Figure 4:
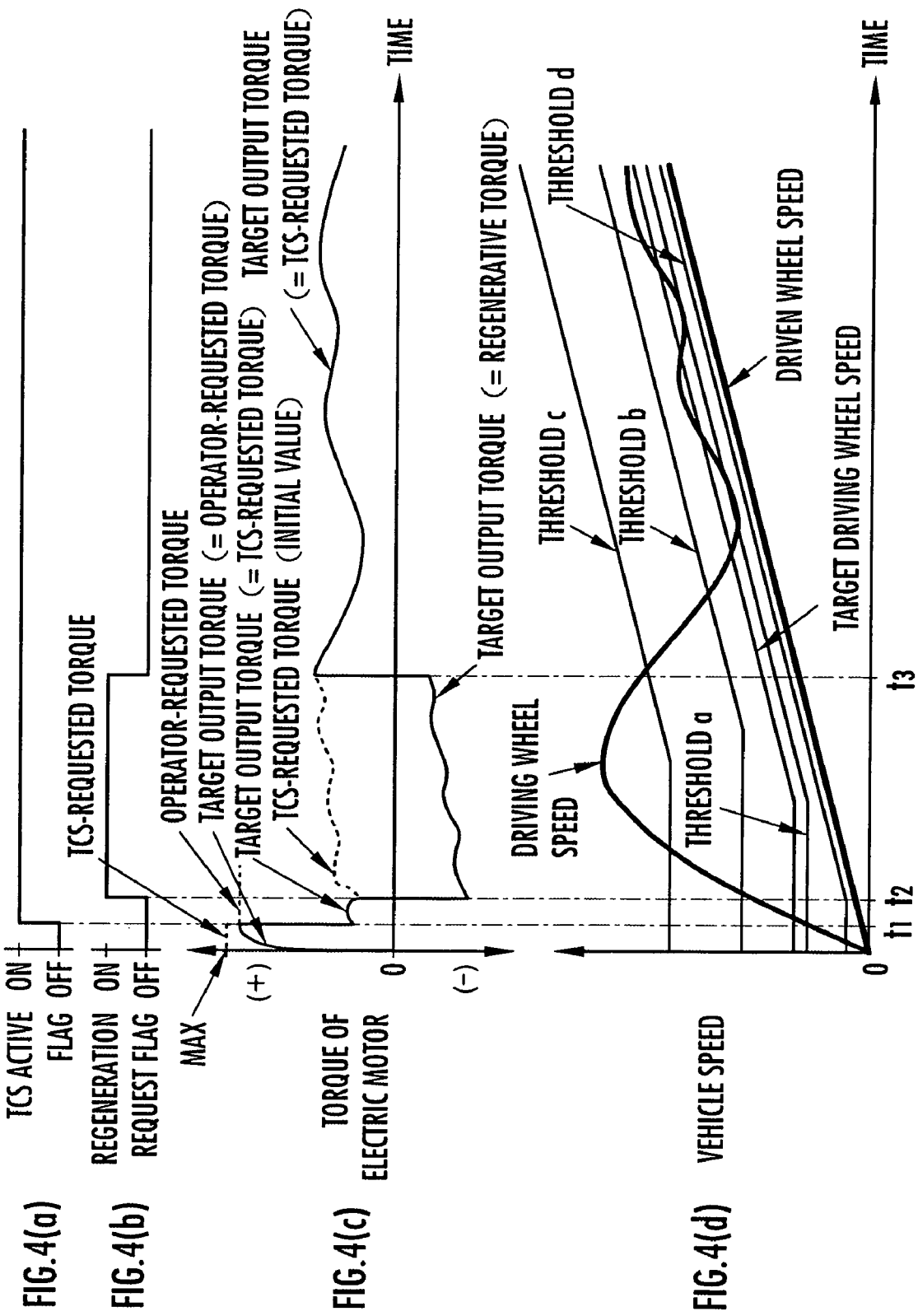
FIG. 4(a) is a graph showing an exemplary temporal change of the value of a TCS active flag.
FIG. 4(b) is a graph showing an exemplary temporal change of the value of a regeneration request flag.
FIG. 4(c) is a graph showing exemplary temporal changes of an operator-requested torque, a TCS-requested torque and a target output torque.
FIG. 4(d) is a graph showing exemplary temporal changes of a driving wheel speed and a driven wheel speed.

Referring to FIG. 4, specific examples of the values of the TCS-requested torque, the target output torque, the TCS action flag and the regeneration request flag determined through the process by the controller 10 described above will be described. For example, if a slippage of the driving wheels 2, 2 occurs immediately after the vehicle 1 starts, the driving wheel speed increases and becomes higher than the driven wheel speed as shown in FIG. 4(*d*). The driving wheel speed reaches a peak value and then decreases. For the sake of convenience, the driven wheel speed is shown as increasing linearly in FIG. 4(*d*). However, the driven wheel speed actually increases with fluctuations.

Figure 3:
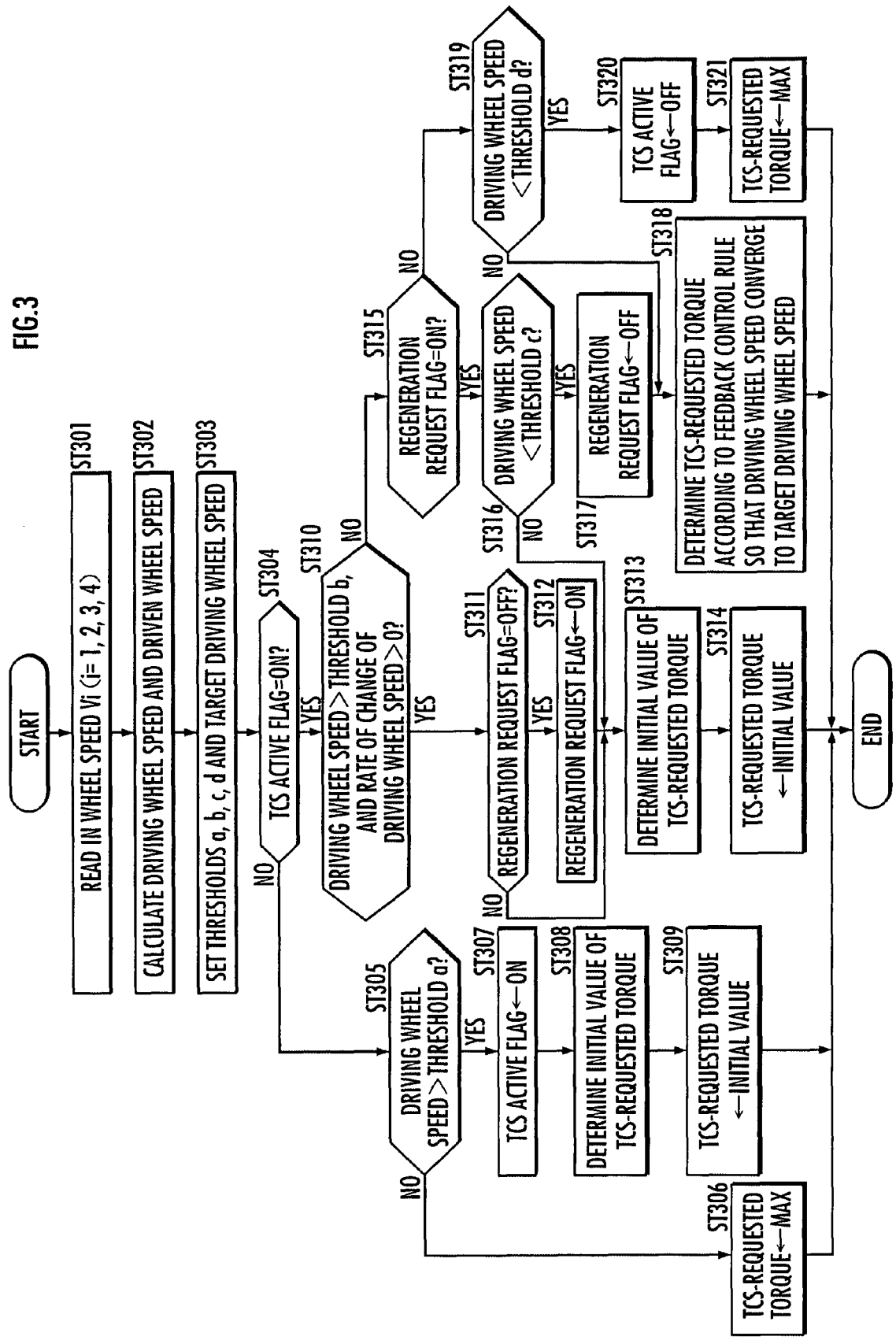
FIG. 3 is a flowchart showing a process carried out by a TCS control calculating section shown in FIG. 2.

If the driving wheel speed exceeds the threshold "a" (at the point in time t1 in FIG. 4), the occurrence of the slippage of the driving wheels 2, 2 is detected (the result of determination in STEP 305 in FIG. 3 is YES), and the value of the TCS active flag is switched from OFF to ON as shown in FIG. 4(*a*). Until the point in time t1, the TCS-requested torque is maintained at the maximum value (MAX) as shown in FIG. 4(*c*) in the processing of STEP 306 in FIG. 3. In addition, at the point in time t1, the TCS-requested torque is set at the initial value in the processing of STEP 309 in FIG. 3. Furthermore, until the point in time t1, the operator-requested torque is designated as the target output torque of the electric motor 5 in the processing of STEP 602 in FIG. 6. In the example shown in FIG. 4, after the point in time t1, the operator-requested torque is maintained at the value at the point in time t1.

Then, if the driving wheel speed further increases and exceeds the threshold "b" (at the point in time t2 in FIG. 4), the value of the regeneration request flag is switched from OFF to ON as shown in FIG. 4(*b*) in the processing of STEP 312 in FIG. 3. The value of the regeneration request flag is maintained at ON until the driving wheel speed becomes lower than the threshold "c" after reaching the peak value (until the point in time t3 in FIG. 3) in the processing in the case where the result of determination in STEP 310 in FIG. 3 is YES or the processing in the case where the result of determination in STEP 316 is NO. In the state where the value of the regeneration request flag is maintained at ON, the TCS-requested torque is set at the initial value in each control processing cycle of the controller 10 as shown in FIG. 4(*c*) in the processing of STEP 314 in FIG. 3. Furthermore, in this state, the regenerative torque determined according to the road surface condition (the regenerative torque determined according to the TCS-requested torque indicating the road surface condition) is designated as the target output torque of the electric motor 5 in the processing of STEP 607 in FIG. 6.

In the period from the point in time t1 to the point in time t2 in FIG. 4, the TCS-requested torque is determined according to the feedback control law (PID control law) in the processing of STEP 318 in FIG. 3. In this case, the initial value of the integral term of the PID control law is set at the initial value of the TCS-requested torque determined at the point in time t1. The TCS-requested torque thus determined is designated as the target output torque in the period from the point in time t1 to the point in time t2 in the processing of STEP 605 in FIG. 6 (here, it is supposed that the TCS-requested torque is lower than the operator-requested torque).

After the value of the regeneration request flag is switched from ON to OFF at the point in time t3 in FIG. 4, the TCS-requested torque is determined according to the feedback control law (PID control law) in the processing of STEP 318 in FIG. 3. In this case, the initial value of the integral term of the PID control law is set at the initial value of the TCS-requested torque determined at a point in time immediately before the point in time t3. In the processing of STEP 605 in FIG. 6, the TCS-requested torque thus determined is designated as the target output torque after the point in time t3 (here, it is supposed that the TCS-requested torque is lower than the operator-requested torque). Thus, the driving wheel speed converges to the target driving wheel speed.

Figure 8A:
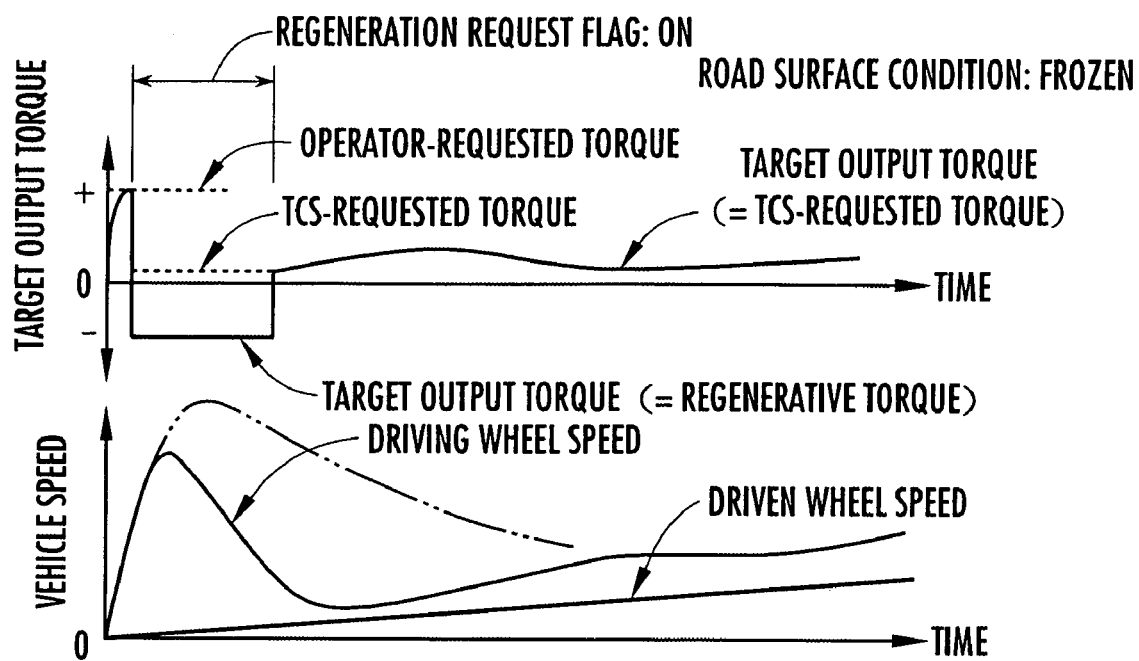
FIG. 8(a) is a graph for illustrating an effect of the first embodiment in the case of a frozen road surface condition.
Figure 8B:
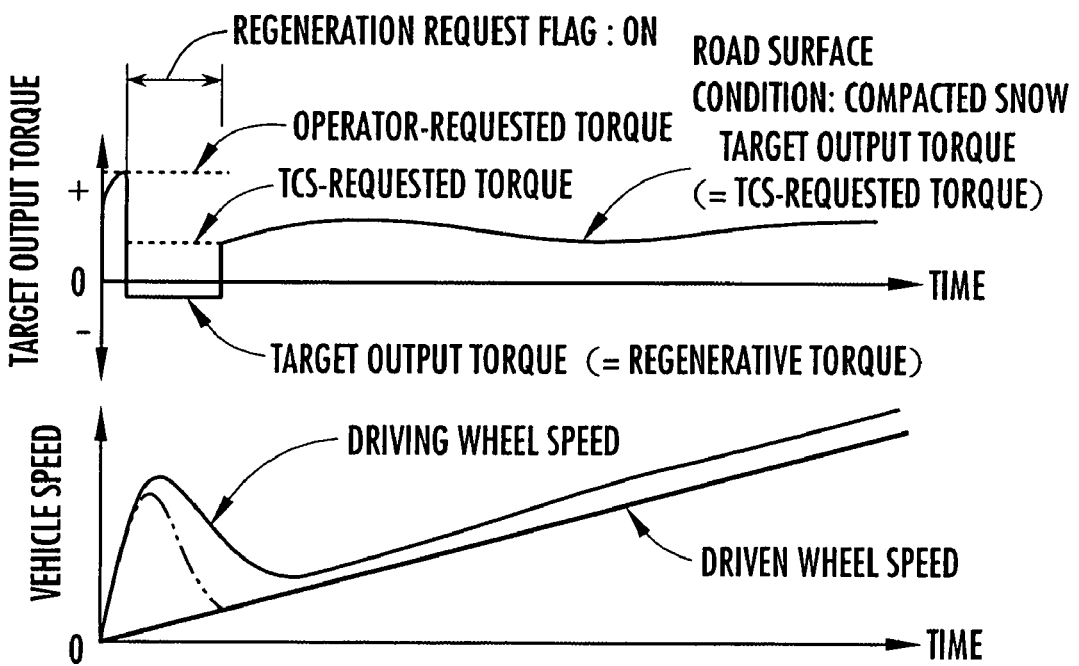
FIG. 8(b) is a graph for illustrating the effect of the first embodiment in the case of a compacted snow road surface condition.

As described above, in this embodiment, after the driving wheel speed exceeds the threshold "a", and a slippage of the driving wheels 2, 2 is detected, the value of the regeneration request flag is set at ON when the increasing driving wheel speed exceeds the threshold "b", and the value of the regeneration request flag is maintained at ON until the driving wheel speed having reached the peak value becomes lower than the threshold "c". In this state, the electric motor 5 carries out the regenerative operation, and the regenerative torque is determined variably according to the TCS-requested torque, which is the index parameter indicating the road surface condition. Specifically, as the road surface becomes more slippery, the magnitude of the regenerative torque increases. Thus, the driving wheel speed can be smoothly changed according to the road surface condition after a slippage occurs, so that it is possible to prevent the slippage of the driving wheels 2, 2 from being eliminated abruptly or the time required to control the slippage from being excessively long. This will be described with reference to FIGS. 8(*a*) and 8(*b*). FIG. 8(*a*) includes a graph (solid line) showing a variation of the target output torque in the case of a frozen (icy) road surface according to this embodiment in the upper part thereof and graphs (solid lines) showing variations of the driving wheel speed and the driven wheel speed in the case of the frozen (icy) road surface according to this embodiment in the lower part thereof. FIG. 8(*b*) includes a graph (solid line) showing a variation of the target output torque in the case of a compacted snow road surface according to this embodiment in the upper part thereof and graphs (solid lines) showing variations of the driving wheel speed and the driven wheel speed in the case of the compacted snow road surface according to this embodiment in the lower part thereof. In FIGS. 8(*a*) and 8(*b*), it is supposed that the operator-requested torque is higher than the TCS-requested torque.

As shown in FIG. 8(*a*), if the road surface is a frozen road surface (if the road surface has a coefficient of friction lower than 0.1), the magnitude of the target output torque (=regenerative torque) in the period in which the electric motor 5 carries out the regenerative operation (the period in which the value of the regeneration request flag is ON) is relatively large. Thus, the driving wheel speed decreases to approach the driven wheel speed in a relatively short time. In addition, since the coefficient of friction of the road surface is low, an abrupt decrease of the driving wheel speed is avoided, and thus, abrupt elimination of the slippage of the driving wheels 2, 2 is avoided.

As shown in FIG. 8(*b*), if the road surface is a compacted snow road surface (if the road surface has a coefficient of friction higher than 0.3), the target output torque (=regenerative torque) in the period in which the electric motor 5 carries out the regenerative operation (the period in which the value of the regeneration request flag is ON) is lower than that in the case of the frozen road surface. Since the coefficient of friction of the road surface is larger than that in the case of the frozen road surface, even if the magnitude of the regenerative torque, which is the target output torque, is low, the driving wheel speed decreases to approach the driven wheel speed in a relatively short time. In addition, since the magnitude of the regenerative torque is relatively small, an abrupt decrease of the driving wheel speed is avoided. Thus, abrupt elimination of the slippage of the driving wheels 2, 2 is avoided.

In the case of the frozen road surface, if the magnitude of the regenerative torque is as small as that in the case of the compacted snow road surface (as in the case shown in FIG. 8(*b*)), the time required for the driving wheel speed to approach the driven wheel speed is elongated compared with this embodiment, as shown by the virtual line in the lower part of FIG. 8(*a*). Therefore, control of the slippage of the driving wheels 2, 2 is delayed. In the case of the compacted snow road surface, if the magnitude of the regenerative torque is as large as that in the case of the frozen road surface (as in the case shown in FIG. 8(*a*)), the driving wheel speed approaches the driven wheel speed more abruptly than in this embodiment, as shown by the virtual line in the lower part of FIG. 8(*b*). As a result, the slippage of the driving wheels 2, 2 can be abruptly eliminated. If the abrupt elimination occurs, a braking force can be unexpectedly applied to the vehicle 1. As a result, an uncomfortable vehicle speed change can occur.

As described above, according to this embodiment, the slippage of the driving wheels 2, 2 can be eliminated in a short time while avoiding abrupt elimination of the slippage, and smooth acceleration of the vehicle can be achieved.

In addition, according to this embodiment, in the period from a point in time when the driving wheel speed is increasing (more specifically, from a point in time when the increasing driving wheel speed exceeds the threshold "b") until a point in time when the driving wheel speed having reached the peak value approaches the driven wheel speed to some extent (more specifically, until a point in time when the driving wheel speed becomes lower than the threshold "c"), the magnitude of the regenerative torque is determined variably according to the TCS-requested torque, which is an index parameter indicating the road surface condition. And, the electric motor 5 carries out the regenerative operation so that the determined regenerative torque is produced. Thus, even if the road surface condition changes during the regenerative operation, the magnitude of the target output torque, which is the regenerative torque, is determined according to the change. As a result, even if the road surface condition changes, the slippage of the driving wheels 2, 2 can be smoothly and quickly controlled while avoiding abrupt elimination of the slippage.

In the following, other embodiments of the present invention will be described. In the embodiments described below, the same components or features as those in the first embodiment are shown in the same drawings and denoted by the same reference numerals as in the first embodiment, and detailed descriptions thereof will be omitted.

In the first embodiment described above, the TCS-requested torque is used as the index parameter indicating the road surface condition. However, for example, the longitudinal acceleration of the vehicle 1 can also be used as the index parameter. A second embodiment, in which the longitudinal acceleration of the vehicle 1 is used as the index parameter, will be described below.

The second embodiment differs from the first embodiment in a part of the processing carried out by the TCS control calculating section 24 and a part of the processing carried out by the motor torque determining section 26. According to the second embodiment, the TCS control calculating section 24 successively outputs the driven wheel acceleration (an estimated value of the longitudinal acceleration of the vehicle 1) used for determining the TCS-requested torque (initial value) to the motor torque determining section 26 as the index parameter indicating the road surface condition when the value of the regeneration request flag is ON (when the electric motor 5 carried out the regenerative operation), in addition to carrying out determination of the TCS-requested torque, setting of the TCS action flag and setting of the regeneration request flag as described in the first embodiment. In the processing carried out by the motor torque determining section 26, in STEP 606 in FIG. 6, the regenerative torque is determined from the driven wheel acceleration based on a preset table shown in FIG. 9. The other points are the same as in the first embodiment.

Figure 9:
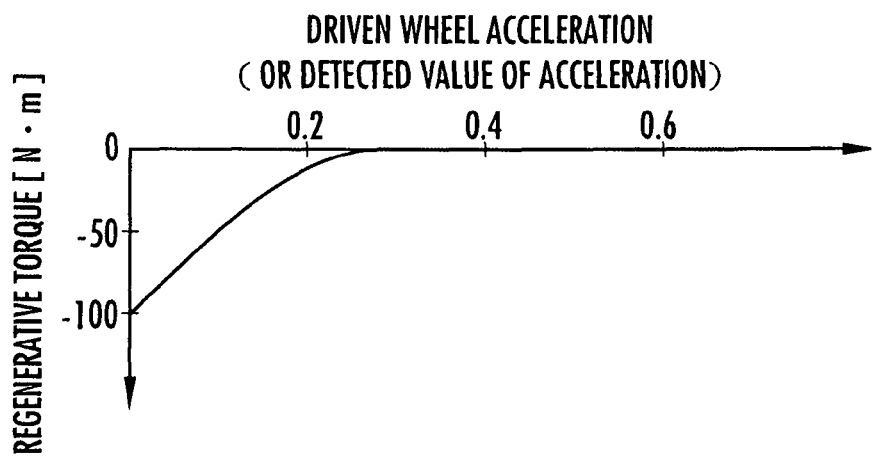
FIG. 9 is a graph showing a table for determining a regenerative torque according to a second embodiment of the present invention.

The table of FIG. 9 is configured so that, in a range of the driven wheel acceleration lower than a predetermined value, the magnitude of the regenerative torque increases as the driven wheel acceleration decreases. In FIG. 9, the driven wheel acceleration is normalized with respect to the gravitational acceleration (a ratio with respect to the gravitational acceleration). Lower driven wheel accelerations mean that the road surface condition is more likely to cause a slippage of the driving wheels 2, 2, (the coefficient of friction of the road surface is lower). Thus, the magnitude of the regenerative torque determined by the table of FIG. 9 increases as the road surface becomes more slippery.

According to the second embodiment, since the regenerative torque (target output torque) of the electric motor 5 during the regenerative operation is determined variably according to the driven wheel acceleration indicating the road surface condition, the same advantages as in the first embodiment can be provided.

In the second embodiment, the driven wheel acceleration, which is an estimated value of the longitudinal acceleration of the vehicle 1, is used as the index parameter indicating the road surface condition. However, the longitudinal acceleration of the vehicle 1 may be detected by an acceleration sensor, and the detected value may be used instead of the driven wheel acceleration.

Now, a third embodiment of the present invention will be described. According to this embodiment, an estimated value of the coefficient of friction of the road surface is used as the index parameter indicating the road surface condition during the regenerative operation of the electric motor 5.

The third embodiment differs from the first embodiment in a part of the processing carried out by the TCS control calculating section 24 and a part of the processing carried out by the motor torque determining section 26. According to the third embodiment, the TCS control calculating section 24 successively outputs the driving wheel speed and the driven wheel speed determined in STEP 302 in FIG. 3 to the motor torque determining section 26, in addition to carrying out determination of the TCS-requested torque, setting of the TCS action request flag and setting of the regeneration request flag as described in the first embodiment. In addition, a driving torque for each driving wheel 2 is input to the motor torque determining section 26 from a torque sensor (not shown) disposed on a rotating shaft of each driving wheel 2. In the processing carried out by the motor torque determining section 26, in STEP 606 in FIG. 6, first, the coefficient of friction $\mu$ of the road surface is estimated from the detected value of the driving torque for each driving wheel 2 and the driving wheel speed and the driven wheel speed supplied from the TCS control calculating section 24. Then, from the estimated value of the coefficient of friction $\mu$, the regenerative torque is determined based on a preset table shown by the graph of FIG. 10, for example. The other points are the same as in the first embodiment.

Figure 10:
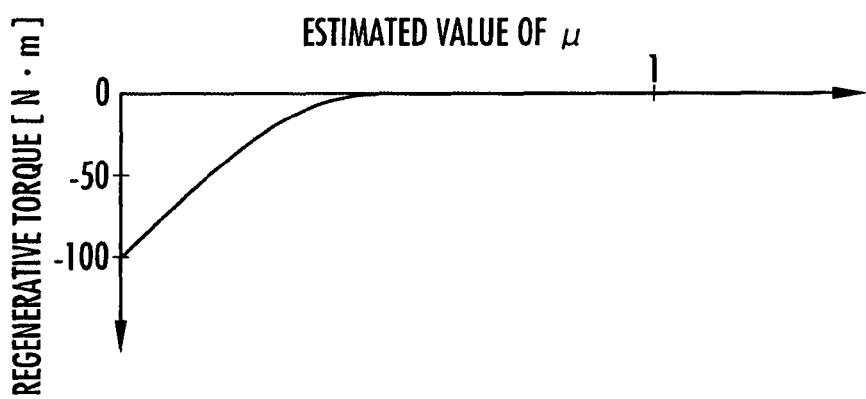
FIG. 10 is a graph showing a table for determining a regenerative torque according to a third embodiment of the present invention.

The table of FIG. 10 is configured so that, in a range of the estimated value of the coefficient of friction μ lower than a predetermined value, the magnitude of the regenerative torque increases as the coefficient of friction μ decreases. Thus, the magnitude of the regenerative torque determined by the table of FIG. 10 increases as the road surface becomes more slippery.

The coefficient of friction μ is estimated in the following manner. First, the detected value of the driving torque for each driving wheel 2 is divided by the effective radius of the driving wheel 2, and the quotients are summed, thereby determining the driving force F (propulsive force) of the vehicle 1 in the direction of travel. Then, the driving force F is divided by the weight m of the vehicle 1 (the weight m is previously stored in a memory (not shown)), thereby determining the acceleration "a" of the vehicle 1. That is, the acceleration "a" of the vehicle 1 is calculated by the following formula (1).

$$a = F/m \quad (1)$$

Then, the difference between the driving wheel speed and the driven wheel speed is divided by the driven wheel speed, thereby determining the slip ratio of the driving wheels 2, 2. That is, the slip ratio is determined by the following formula (2).

$$\text{Slip ratio} = (\text{driving wheel speed} - \text{driven wheel speed})/\text{driven wheel speed} \quad (2)$$

Then, the acceleration "a" is divided by the maximum possible acceleration of the vehicle 1 (the maximum possible acceleration is previously stored in a memory (not shown)). Using a resulting value "a'" (referred to as normalized acceleration "a'", hereinafter) and the slip ratio, the estimated value of the coefficient of friction μ of the road surface is determined by the following formula (3).

$$\mu = a' \times K + 1 \times (1 - K) \quad (3)$$

Figure 11:
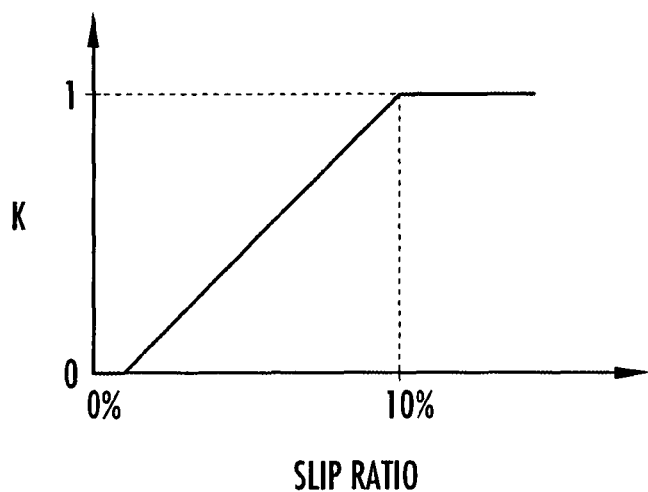
FIG. 11 is a graph showing a table for determining a coefficient used for estimating the coefficient of friction of a road surface according to the third embodiment.

In this formula (3), reference character K denotes a value ($0 \leq K \leq 1$) determined from the slip ratio based on a preset table shown by the graph of FIG. 11. The table of FIG. 11 is configured so that, in a range of the slip ratio equal to or lower than 10%, the value K linearly increases from 0 to 1 as the slip ratio increases, except when the slip ratio is an extremely low value equal to or lower than a predetermined value. When the slip ratio is such an extremely low value, the value K is 0.

The estimated value of the coefficient of friction μ of the road surface is determined in this way and used for determining the regenerative torque as described above. There are known various other methods of estimating the coefficient of friction μ, and the coefficient of friction μ may be estimated by such a known method. Furthermore, in this embodiment, the acceleration "a" of the vehicle 1 is estimated according to the formula (1) in order to determine the estimated value of the coefficient of friction μ. However, the driven wheel acceleration or a detected value of an acceleration sensor may be used instead of the acceleration "a".

According to the third embodiment, since the regenerative torque (target output torque) of the electric motor 5 during the regenerative operation is determined variably according to the estimated value of the coefficient of friction μ indicating the road surface condition, the same advantages as in the first embodiment can be provided.

Now, fourth to sixth embodiments of the present invention will be described. In the first to third embodiments, the regenerative torque of the electric motor 5 during the regenerative operation is determined variably according to only the index parameter indicating the road surface condition. However, in the fourth to sixth embodiments described below, the regenerative torque is determined by taking into account not only the index parameter indicating the road surface condition but also the operator-requested torque.

The fourth embodiment differs from the first embodiment only in a part of the processing carried out by the motor torque determining section 26. According to the fourth embodiment, in the processing carried out by the motor torque determining section 26, in STEP 606 in FIG. 6, the regenerative torque is determined from the difference between the operator-requested torque and the TCS-requested torque (=the operator-requested torque minus the TCS-requested torque) based on a preset table shown in FIG. 12, for example. The other points are the same as in the first embodiment.

Figure 12:
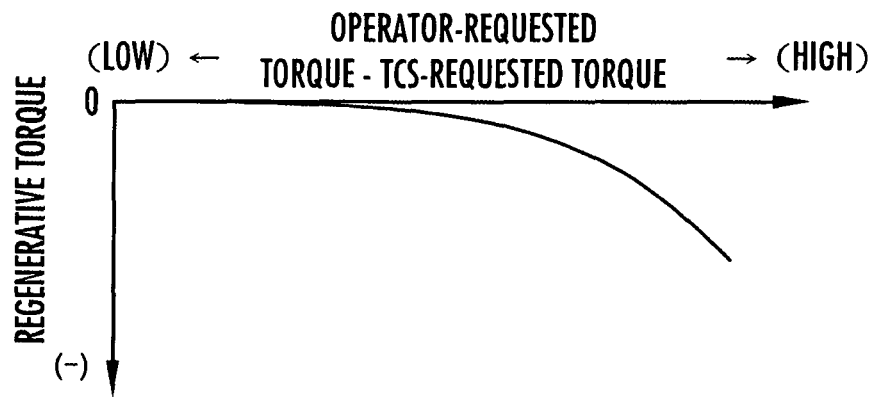
FIG. 12 is a graph showing a table for determining a regenerative torque according to a fourth embodiment of the present invention.

The table of FIG. 12 is configured so that, in a range of the value of the operator-requested torque minus the TCS-requested torque larger than a predetermined value, the magnitude of the regenerative torque increases as the value of the operator-requested torque minus the TCS-requested torque increases. Thus, the magnitude of the regenerative torque determined by the table of FIG. 12 decreases as the operator-requested torque decreases, even if the road surface condition is not changed. Thus, even when the road surface is slippery, if the amount of manipulation of the accelerator pedal by an operator is relatively small, and the operator-requested torque is relatively low, the regenerative torque of the electric motor 5 during the regenerative operation is reduced compared with the case where the operator-requested torque is relatively high. Thus, the possibility that the torque produced by the electric motor 5 abruptly changes from the driving torque to a high regenerative torque at the start of the regenerative operation of the electric motor 5 can be reduced compared with the first embodiment. As a result, the load on the electric motor 5 for controlling the slippage of the driving wheels 2, 2 can be reduced.

In the fourth embodiment, if the operator-requested torque is constant, the magnitude of the regenerative torque of the electric motor 5 during the regenerative operation increases as the TCS-requested torque decreases, or in other words, the road surface becomes more slippery. Therefore, of course, the same advantages as in the first embodiment can be achieved.

The fifth embodiment differs from the second embodiment only in a part of the processing carried out by the motor torque determining section 26. According to the fifth embodiment, from the difference between the operator-requested torque and a driving torque of the electric motor 5 reduced from the driven wheel acceleration (or the detected value of the longitudinal acceleration of the vehicle 1 obtained by an acceleration sensor) (referred to as acceleration-based torque) (=the operator-requested torque minus the acceleration-based torque), the regenerative torque is determined based on a preset table shown in FIG. 13. The other points are the same as in the second embodiment.

The driven wheel acceleration (or the detected value of the longitudinal acceleration of the vehicle 1 obtained by an acceleration sensor) is reduced to the acceleration-based torque in the following manner. First, the driven wheel acceleration (or the detected value of the longitudinal acceleration of the vehicle 1) is multiplied by the weight of the vehicle 1 (the weight is previously stored in a memory (not shown)), thereby determining the total driving force of the driving wheels 2, 2 (the driving force (translation force) that can be applied to the vehicle 1 by the friction between the driving wheels 2, 2 and the road surface). Then, the total driving force is multiplied by the effective radius of the driving wheels 2, 2, and the product is divided by the speed reduction ratio of the power transmission mechanism 6. In this way, the acceleration-based torque results.

Figure 13:
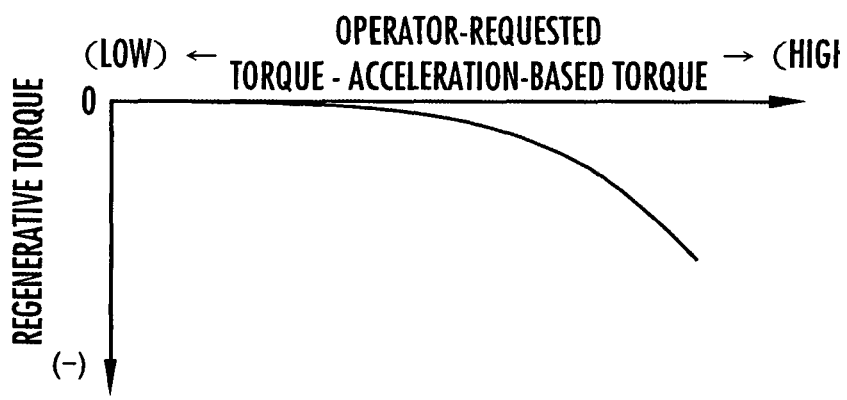
FIG. 13 is a graph showing a table for determining a regenerative torque according to a fifth embodiment of the present invention.

The table of FIG. 13 is configured so that, in a range of the value of the operator-requested torque minus the acceleration-based torque larger than a predetermined value, the magnitude of the regenerative torque increases as the value of the operator-requested torque minus the acceleration-based torque increases. Thus, as in the fourth embodiment described above, the magnitude of the regenerative torque determined by the table of FIG. 13 decreases as the operator-requested torque decreases, even if the road surface condition is not changed. Thus, as in the fourth embodiment, the possibility that the torque produced by the electric motor 5 abruptly changes from the driving torque to a high regenerative torque at the start of the regenerative operation of the electric motor 5 can be reduced compared with the first and second embodiments. As a result, the load on the electric motor 5 for controlling the slippage of the driving wheels 2, 2 can be reduced.

In the fifth embodiment, if the operator-requested torque is constant, the magnitude of the regenerative torque of the electric motor 5 during the regenerative operation increases as the road surface becomes more slippery (the acceleration-based torque decreases). Therefore, of course, the same advantages as in the first embodiment can be achieved.

The sixth embodiment differs from the third embodiment only in a part of the processing carried out by the motor torque determining section 26. According to the sixth embodiment, from the difference between the operator-requested torque and a driving torque of the electric motor 5 reduced from the estimated value of the coefficient of friction μ (referred to as μ-based torque) (=the operator-requested torque minus the μ-based torque), the regenerative torque is determined based on a preset table shown in FIG. 14. The other points are the same as in the third embodiment.

Figure 14:
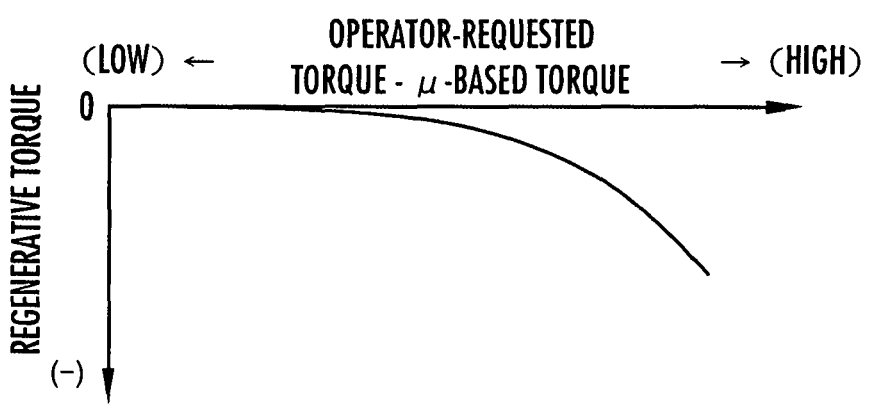
FIG. 14 is a graph showing a table for determining a regenerative torque according to a sixth embodiment of the present invention.

The estimated value of the coefficient of friction μ is reduced to the μ-based torque by multiplying the estimated value by a predetermined conversion coefficient (>0). The μ-based torque means a driving torque of the electric motor 5 that can be transferred to the driving wheels 2, 2 without causing a slippage of the driving wheels 2, 2. The table of FIG. 14 is configured so that, in a range of the value of the operator-requested torque minus the μ-based torque larger than a predetermined value, the magnitude of the regenerative torque increases as the value of the operator-requested torque minus the μ-based torque increases. Thus, as in the fourth embodiment described above, the magnitude of the regenerative torque determined by the table of FIG. 14 decreases as the operator-requested torque decreases, even if the road surface condition is not changed. Thus, as in the fourth embodiment, the possibility that the torque produced by the electric motor 5 abruptly changes from the driving torque to a high regenerative torque at the start of the regenerative operation of the electric motor 5 can be reduced compared with the first and third embodiments. As a result, the load on the electric motor 5 for controlling the slippage of the driving wheels 2, 2 can be reduced.

In the sixth embodiment, if the operator-requested torque is constant, the magnitude of the regenerative torque of the electric motor 5 during the regenerative operation increases as the road surface becomes more slippery (the estimated value of the coefficient of friction μ decreases). Therefore, of course, the same advantages as in the first embodiment can be achieved.

In the first to sixth embodiments described above, the vehicle 1 is an electrically powered vehicle having only the electric motor 5 as the propulsive force source. However, of course, the present invention can be equally applied to a hybrid vehicle having an electric motor and an engine as propulsive force sources (parallel hybrid vehicle), a series hybrid vehicle having a generator that generates electric power using an engine, or an electric automobile having only an electric condenser as a power supply, for example.

Furthermore, in the embodiments described above, the present invention is applied to a vehicle having two driving wheels and two driven wheels. However, the present invention can be equally applied to a vehicle having four driving wheels (a 4WD vehicle). In this case, the estimated vehicle speed (estimated value of the speed of the vehicle) and the estimated vehicle acceleration (estimated value of the acceleration of the vehicle) can be used instead of the driven wheel speed and the driven wheel acceleration. The estimated vehicle speed and the estimated vehicle acceleration can be determined by various known methods. For example, an acceleration sensor may be attached to the body, the detected acceleration value obtained by the acceleration sensor may be used as the estimated vehicle acceleration, and the estimated vehicle speed can be determined by integrating the detected acceleration value.

As described above, the present invention advantageously provides a traction control device that can appropriately control a slippage of a driving wheel of a vehicle.

The invention claimed is:

1. A traction control device for a vehicle, comprising:
an electric motor that is coupled to a driving wheel of the vehicle and is capable of carrying out a regenerative operation to produce a regenerative torque; and
a means for detecting occurrence of a slippage of said driving wheel, the slippage occurring when a rotational speed of the driving wheel exceeds a speed of the vehicle, the traction control device for the vehicle being configured so that, when the occurrence of the slippage of said driving wheel is detected, the traction control device makes said electric motor produce the regenerative torque to apply a braking force to the driving wheel, thereby suppressing the slippage of the driving wheel, the traction control device further including:
electric motor controlling means for controlling the regenerative torque produced by said electric motor in a variable manner when the occurrence of the slippage of said driving wheel is detected, the controlling occurring based on a determined value indicative of a road surface condition, the determined value used as an index parameter to a predetermined amount of regenerative torque, the amount of regenerative torque increasing in slippery road surface conditions; and
means for detecting or estimating the acceleration of said vehicle, wherein, in a period in which said electric motor produces the regenerative torque, said electric motor controlling means uses said detected or estimated acceleration as said determined value,
wherein, after the occurrence of the slippage of said driving wheel is detected, in a period from the point in time when the rotational speed of the driving wheel increases and exceeds a predetermined first threshold until the rotational speed of the driving wheel decreases to a predetermined second threshold after reaching a peak value, said electric motor produces the regenerative torque while controlling the regenerative torque in a variable manner according to the value of said index parameter, and, after a detection of the rotational speed of the driving wheel decreasing to be equal to or lower than the predetermined second threshold, the regenerative torque is stopped and the electric motor changes to a power running operation.

2. The traction control device for a vehicle according to claim 1, comprising driving wheel speed detecting means for detecting the rotational speed of said driving wheel.

3. The traction control device for a vehicle according to claim 1, comprising means for determining a requested torque of said electric motor, as an operator-requested torque, according to the amount of manipulation of an accelerator of said vehicle by an operator of said vehicle, wherein, in a period in which said electric motor produces the regenerative torque, said electric motor controlling means controls the regenerative torque in a variable manner according to the values of said determined operator-requested torque and said index parameter.

4. The traction control device for a vehicle according to claim 3, wherein, in the period in which said electric motor produces the regenerative torque, said electric motor controlling means determines a requested torque of said electric motor, which is required to produce the acceleration of said vehicle, as an acceleration-based torque according to the acceleration, and controls said regenerative torque in a variable manner according to the difference between said determined operator-requested torque and the acceleration-based torque.

* * * * *